(12) United States Patent
Martin

(10) Patent No.: US 11,440,683 B2
(45) Date of Patent: Sep. 13, 2022

(54) DEVICE AND METHOD FOR REGULATING A GAS FLOW RATE

(71) Applicant: L'Air Liquide, Societe Anonyme pour l'Etude et l'Exploitation des Procedes Georges Claude, Paris (FR)

(72) Inventor: Francois Martin, Voreppe (FR)

(73) Assignee: L'Air Liquide, Société Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 469 days.

(21) Appl. No.: 16/463,125

(22) PCT Filed: Nov. 14, 2017

(86) PCT No.: PCT/FR2017/053101
§ 371 (c)(1),
(2) Date: May 22, 2019

(87) PCT Pub. No.: WO2018/096236
PCT Pub. Date: May 31, 2018

(65) Prior Publication Data
US 2020/0062427 A1    Feb. 27, 2020

(30) Foreign Application Priority Data
Nov. 23, 2016    (FR) ...................... 1661395

(51) Int. Cl.
*B64G 1/40*       (2006.01)
*B64G 1/26*       (2006.01)
(Continued)

(52) U.S. Cl.
CPC ............... *B64G 1/402* (2013.01); *F02K 9/58* (2013.01); *G05D 7/0629* (2013.01)

(58) Field of Classification Search
CPC ........... B64G 1/402; B64G 1/405; F02K 9/58; F03H 1/0012; F03H 1/0031; G05D 7/0629; F02C 1/10
(Continued)

(56) References Cited

U.S. PATENT DOCUMENTS 3,922,850 A * 12/1975 McCabe .................. F02C 7/26
                                                    60/39.281
4,553,519 A * 11/1985 Masson .................. F02M 13/08
                                                    123/527
(Continued)

FOREIGN PATENT DOCUMENTS

CN      106 015 685     10/2016
EP       1 204 906       5/2002
(Continued)

OTHER PUBLICATIONS

International Search Report and Written Opinion for PCT/FR2017/053101, dated Feb. 21, 2018.
(Continued)

*Primary Examiner* — Jeffrey P Aiello
(74) *Attorney, Agent, or Firm* — Christopher J. Cronin

(57) ABSTRACT

Device and method for regulating a flow rate of gas intended to supply a propulsion apparatus for a spacecraft comprising xenon tank, a circuit comprising a withdrawing pipe having an upstream end connected to the tank and a downstream end connected to a propulsion member, the withdrawing pipe comprising an isolation first valve, a regulating second valve and a member for measuring the pressure downstream of the regulating second valve. The regulating second valve regulates the flow rate and/or the determined pressure according to the pressure measured. The regulating second valve is a proportional valve of electrically operated variable throughout PCV type.

12 Claims, 1 Drawing Sheet

(51) Int. Cl.
*F02K 9/58* (2006.01)
*G05D 7/06* (2006.01)
*F03H 1/00* (2006.01)

(58) Field of Classification Search
USPC ............... 73/149; 137/80, 487.5, 557, 613; 340/611, 945; 700/282; 702/45, 47, 50, 702/100, 136
See application file for complete search history.

(56) References Cited

U.S. PATENT DOCUMENTS

| | | | | |
|---|---|---|---|---|
| 4,838,021 | A * | 6/1989 | Beattie | F03H 1/0018 315/111.81 |
| 5,954,089 | A * | 9/1999 | Seymour | G05D 16/2033 137/487.5 |
| 5,997,813 | A * | 12/1999 | Yaskoff | A61L 2/26 422/108 |
| 6,301,876 | B1 * | 10/2001 | Back | F03H 1/0012 60/202 |
| 10,451,591 | B1 * | 10/2019 | Gebauer | F16K 99/0015 |
| 2002/0166320 | A1 * | 11/2002 | Buscher | F15B 11/0423 60/425 |
| 2006/0049274 | A1 * | 3/2006 | Hume | B24C 1/003 239/225.1 |
| 2008/0023662 | A1 * | 1/2008 | Reinicke | F16K 15/1823 251/58 |
| 2009/0099730 | A1 * | 4/2009 | McClure | G05D 1/027 701/41 |
| 2011/0139123 | A1 * | 6/2011 | Brocard | F02C 9/28 123/458 |
| 2012/0042657 | A1 * | 2/2012 | Hodinot | F02C 9/263 60/772 |
| 2012/0318133 | A1 * | 12/2012 | Truglia | B60K 3/02 91/55 |
| 2013/0200219 | A1 | 8/2013 | Marchandise et al. | |
| 2016/0123291 | A1 * | 5/2016 | Nagasaki | F02M 63/0225 123/456 |
| 2016/0319955 | A1 * | 11/2016 | Gebauer | B01D 29/90 |
| 2016/0326990 | A1 * | 11/2016 | Pursifull | F02M 25/06 |
| 2017/0167474 | A1 * | 6/2017 | Cannata | F04B 49/24 |

FOREIGN PATENT DOCUMENTS

| | | |
|---|---|---|
| FR | 2 697 587 | 5/1994 |
| FR | 2 973 081 | 9/2012 |
| WO | WO 97/46820 | 12/1997 |
| WO | WO 2016/151251 | 9/2016 |

OTHER PUBLICATIONS

French Search Report and Written Opinion for FR 1661395, dated Aug. 7, 2017.

Cho, HK, et al., "Development of Hall Thruster Propulsion system for STSAT-3 Application," ACTA Astronautica, Pergamon Press, Elmsford, GB, vol. 72, Oct. 24, 2011, pp. 90-97.

Matticari, et al., New Generation Propellant Flow Control Components for Electric Propulsion Systems: Status of Achievements at Alcatel Alenia Space Italia/Laben-Proel; Oct. 31, 2005, URL: http://erps.spacegrant.org/uploads/images/images/Iepc_articledownload_ 1988-2007/2005index/023.pdf.

Pehrson, David M., "Continuing Development of the Proportional Flow Control Valve (PFCV) for Electric Propulsion Systems," Sep. 20, 2007, pp. 1-11, URL:http://electricrocket.org/IEPC/IEPC-2007-346.pdf.

* cited by examiner

DEVICE AND METHOD FOR REGULATING A GAS FLOW RATE

CROSS-REFERENCE TO RELATED APPLICATIONS

This application is a § 371 of International PCT Application PCT/FR2017/053101, filed Nov. 14, 2017, which claims § 119(a) foreign priority to French patent application FR 1 661 395, filed Nov. 23, 2016.

BACKGROUND

Field of the Invention

The invention relates to a device and a method for regulating a gas flow rate.

The invention relates more particularly to a device and a method for regulating a gas flow rate intended for supplying a propulsion apparatus for a spacecraft.

The invention relates in particular to a device for regulating a flow rate of gas intended to supply a propulsion apparatus for a spacecraft comprising a tank of pressurized gas, in particular xenon, a fluidic circuit connected to the tank and comprising a withdrawing pipe having an upstream end connected to the tank and at least one downstream end intended to be connected to a propulsion member such as a plasma engine, the withdrawing pipe comprising, arranged in series from upstream to downstream, an isolating first valve, a regulating second valve and a member for measuring the pressure downstream of the regulating second valve, the regulating second valve being configured to provide defined regulation of flow rate and/or pressure in dependence on the pressure measured by the downstream pressure measurement member.

Related Art

Plasma-propelled satellites have propulsion that uses a gas such as xenon. The regulated flow of gas supplies two branches, each provided with a calibrated orifice for supplying respectively an anode and a cathode of the propulsion system.

In order to obtain satisfactory propulsion, a precise flow rate of gas must be supplied to the propulsion members.

A known flow rate regulating device uses two valves in series: a normally-closed upstream isolating valve (with all-or-nothing control) and a downstream flow rate regulating valve. The downstream valve is a valve with all-or-nothing control which is controlled in terms of pressure by a downstream pressure switch (cf. for example the regulator produced by VACCO ("smart flow control" ref. 1302500-01). That is to say that, depending on the pressure (or imposed flow rate) setpoint, the downstream pressure switch will order the second valve to open close in order to regulate the pressure and the flow rate to the setpoint. This all-or-nothing control is also referred to in English as "bang-bang" control.

However, this solution gives rise to pressure variations in the resulting gas flow (of the order of at least 5% either side of the setpoint pressure). Furthermore, with this solution regulation ceases to be possible in the event of a fault with the controlled valve.

According to another known configuration, two "all-or-nothing" valves are arranged in series in the withdrawing pipe, and each of the branches (anode and cathode) contains a regulating valve. This solution, besides its high cost and complexity (four valves), does not provide a satisfactory solution to the above-mentioned problems.

SUMMARY OF THE INVENTION

One objective of the present invention is to mitigate all or some of the above-mentioned drawbacks of the prior art.

To that end, the device according to the invention, which is otherwise covered by the generic definition given in the above preamble, is essentially characterized in that at least the regulating second valve consists of a proportional valve of the electrically controlled variable throughput "PCV" type.

Moreover, some embodiments of the invention may include one or more of the following features:

the isolating first valve also consists of a proportional valve of the electrically controlled variable throughput "PCV" type, the device comprises an electronic data acquisition, storage and processing member configured to control one or both of the second valve and the first valve on the basis of the value measured by the downstream pressure measurement member, the device comprises a member for measuring the pressure upstream of the first valve, the electronic data acquisition, storage and processing member being configured to control one or both of the second valve and the first valve on the basis of the value measured by the upstream pressure measurement member, in the absence of any fault with the second valve, the electronic data acquisition, storage and processing member is configured to control the first valve in all-or-nothing operation, that is to say that the first valve is switched only between two configurations: fully open and fully closed, and in that the electronic data acquisition, storage and processing member is configured to control the second valve in proportional operation, that is to say with a plurality of possible degrees of opening so as to regulate the flow rate of withdrawn gas to a defined flow rate and/or pressure, from among a plurality of possible values, in the event of a fault with the second valve, the electronic data acquisition, storage and processing member is configured to control the first valve in proportional operation so as to regulate the flow rate of withdrawn gas to a defined flow rate and/or pressure, from among a plurality of possible values, one or both of the second valve (8) and the first valve is a thermally activated proportional regulating valve, the thermally activated proportional regulating valve is normally closed when it is not heated above a given threshold, for example between 50 and 180° C. and preferably between 80 and 120° C., the thermally activated proportional regulating valve comprises a body defining an inlet and an outlet for the gas and housing, between the inlet and the outlet, at least one and preferably two pistons and an obturator such as a sapphire that is configured to interrupt or permit a defined flow of gas between the inlet and the outlet depending on the relative position between the obturator and the piston or pistons, the piston or pistons secured to the body, the outer body being provided with a heating member, the body having a thermal expansion coefficient different from that of the pistons so as to move the pistons relative to the obturator in defined positions depending on the degree of heating of the body so as to regulate the flow rate of gas, one or both of the second valve and the first valve is regulated according to a proportional-integral control or proportional-integral-derivative control, one or both of the second valve and the first valve is configured to regulate a flow of gaseous xenon between 0 and 50 mg/s and preferably between 0 and 20 mg/s, the fluidic circuit comprises at least one gas withdrawing branch having an upstream end connected to the withdrawing pipe upstream of the first valve and a downstream end intended to be connected to a gas consumer, the withdrawing branch comprising at least one valve, the valve of the at least one withdrawing branch is a proportional valve of the electrically controlled variable throughput "PCV" type, the device comprises a member for measuring the temperature upstream of the first valve, the electronic data acquisition, storage and processing member being configured to control one or both of the second valve and the first valve on the basis of the value measured by the upstream temperature measurement member, the device comprises a member for measuring the temperature downstream of the regulating second valve, at least the regulating second valve being configured to provide defined regulation of flow rate and/or pressure in dependence on the temperature measured by the downstream temperature measurement member.

The invention also relates to a method for supplying xenon to a propulsion apparatus for a spacecraft by means of a flow rate regulating device as set out in any one of the features above or below, in which a flow of gas is transferred from the tank to the downstream end of the withdrawing pipe at a pressure and/or flow rate that is defined by means of proportional controlling of the regulating second valve in relation to the pressure value measured by the downstream pressure measurement member.

The invention may also relate to any alternative device or method comprising any combination of the features above or below.

BRIEF DESCRIPTION OF THE FIGURES

Other particular features and advantages will become apparent from reading the following description, given with reference to the figures, in which.

DETAILED DESCRIPTION OF THE INVENTION

Figure 1:
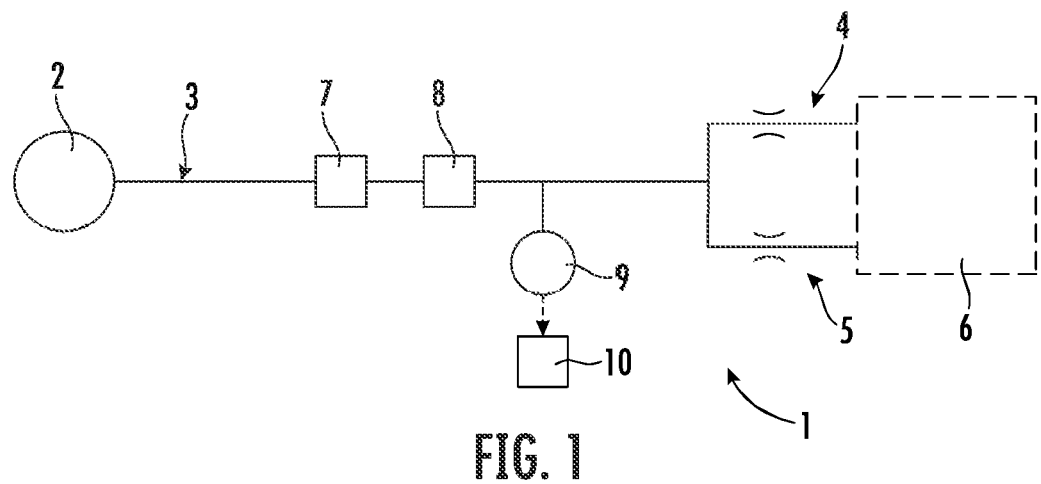
FIG. 1 is a schematic and partial view illustrating a first example of a structure and operation of a regulating device according to the invention.
Figure 2:
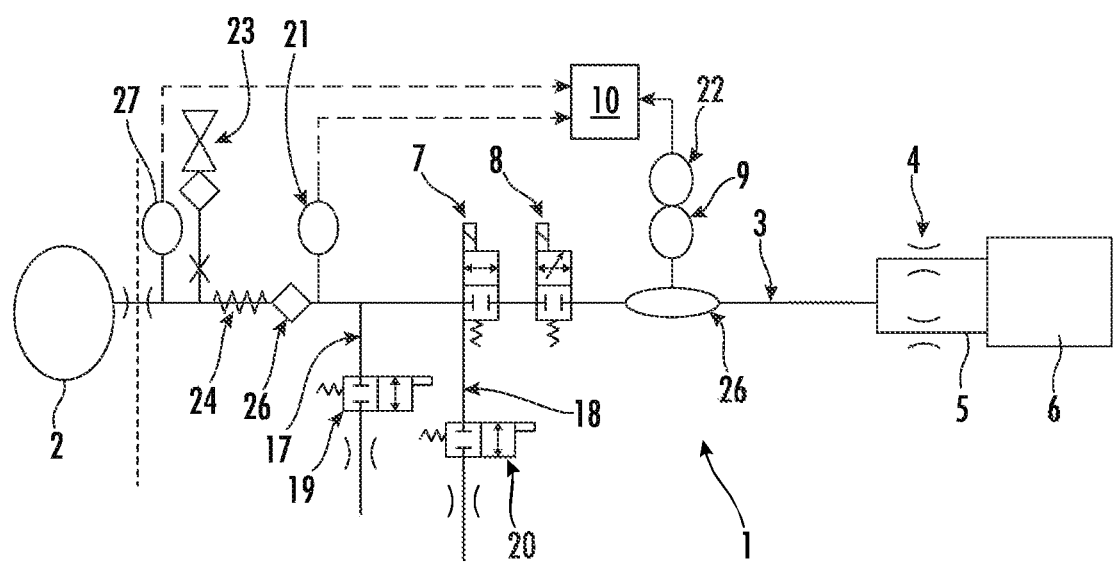
FIG. 2 is a schematic and partial view illustrating a second example of a structure and operation of a regulating device according to the invention.

The gas flow rate regulating device 1 illustrated in FIGS. 1 and 2 is intended for supplying a propulsion apparatus for a spacecraft. This device conventionally comprises a tank 2 of pressurized gas, for example xenon, at a pressure of, in particular, between several bar and 200 bar.

The device comprises a withdrawing pipe 3 having an upstream end connected to the tank 2 and a downstream end 4, 5 intended to be connected to the propulsion member 6. More specifically, the downstream end may split into two parallel lines 4, 5 that are respectively connected to the supply of the anode and of the cathode of the propulsion system. These two lines 4, 5 each preferably comprise only one calibrated orifice and no controlled valve system.

The withdrawing pipe 3 comprises, upstream of the two lines 4, 5, a system of valves 7, 8 for regulating the gas flow rate. In particular, the device 1 comprises an isolating first valve 7 and a regulating second valve 8. Downstream of the regulating second valve 8, the device comprises a pressure measurement member 9 (such as a pressure transducer) downstream of the regulating second valve 8. This regulating second valve 8 is configured to provide defined regulation of flow rate and/or pressure in dependence on the pressure measured by the downstream pressure measurement member 9.

According to one advantageous feature, the regulating second valve 8 consists of a proportional valve of the electrically controlled variable throughput "PCV" type.

For example, the device comprises an electronic data acquisition, storage and processing member 10 configured to control the second valve 8 (and possibly also the first valve 7) on the basis of the value measured by the downstream pressure measurement member 9.

Preferably, the second valve 8 is controlled in proportional operation (in particular proportional-integral-derivative or "PID"). That is to say that the variable opening of the second valve is ordered so as to achieve a defined setpoint for pressure and/or for mass flow rate (for example respectively one to two bar and 1.2 to 2 mg/s).

The electronic data acquisition, storage and processing member 10 comprises for example a microprocessor and may be an automaton, a computer or any other equivalent system. This electronic logic for controlling the valve 8 may for example be integrated into the valve 8 or located in separate equipment.

According to this configuration, when a pressure level is regulated (for example the pressure downstream of the second valve 8 is kept at 1.8 bar. This mode of regulation makes it possible to maintain this setpoint pressure with very good precision and stability (for example with a fluctuation of at most 1%).

Preferably, the valve 8 is a thermally activated proportional regulating valve (cf. for example the example of document EP1204906A1). For example, the valve 8 is normally closed when it is not heated above a given threshold, for example between 50 and 180° C. and preferably between 80 and 120° C. and the heating setpoint makes it possible to regulate the degree of opening in order to modify the gas flow rate.

Figure 3:
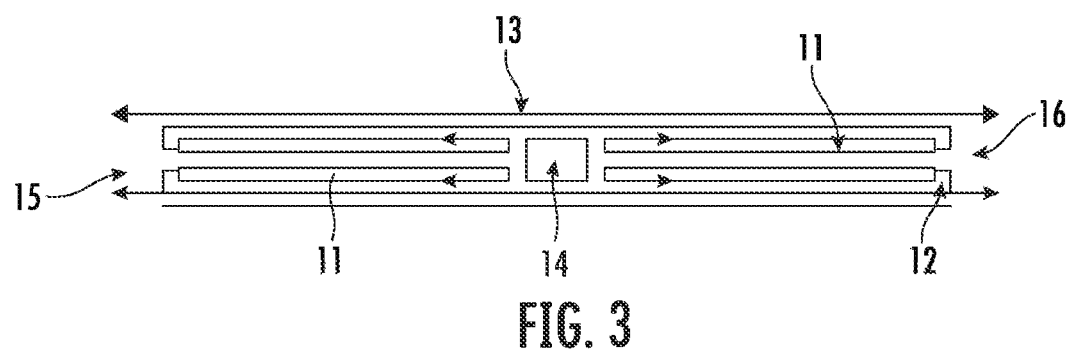
FIG. 3 is a schematic and partial view in section illustrating an example of a structure and operation of a valve which may be used in the regulating device according to the invention.

For example, and as shown in FIG. 3, the thermally activated proportional regulating valve 8 may comprise a body 12 defining an inlet 15 and an outlet 16 for the gas. The body 12 houses, between the inlet 15 and the outlet 16, at least one and preferably two tubular pistons 11 and an obturator 14 such as a sapphire that is arranged between the two pistons 11. The obturator 14 is configured to interrupt or permit a defined flow of gas between the inlet 15 and the outlet 16, through the pistons 11, depending on the relative position between the obturator 14 and the pistons 11.

The pistons 11 are secured to the body 12 (for example by welding to the two ends of the body). The outer body 12 is provided with a heating member 13 such as a resistance coiled around the body 12. The body 12 (for example made of stainless steel or Inconel) has a thermal expansion coefficient that is different from that of the pistons 11 (which are for example made of an iron alloy such as Inver).

The valve 8 is normally (when unheated) closed. In this position, the pistons 11 are in sealing contact with the obturator 14. Opening is brought about by heating of the resistance 13. This heating causes expansion of the body 12 which is greater than the expansion of the pistons 11 and of the obturator 14. The pistons 11 are then separated from the obturator 14 (separation with respect to the obturator in the direction of the arrows in FIG. 3).

For example, a power of 2 W and a current of 300 mA may be sufficient for this control by heating. The typical temperatures required for opening and regulating this opening may be chosen in dependence on the parameters of fabrication of the valve. Without limitation, these temperatures may for example be between 80 and 120° C.

This valve 8 may receive, at its inlet, gas at a pressure of the order of 200 bar for example.

This type of valve is compact (mass five grams and length of the order of two centimeters) and is particularly well adapted for regulating a gas flow rate for example between zero and 20 mg/s via a control system of the PID type. The physical variable controlled in PID fashion in order to regulate the pressure/the flow rate may be the electric current supplied to the heating resistance of the valve 8.

According to one advantageous feature, preferably the isolating first valve 7 may also consist of a proportional valve of the electrically controlled variable throughput "PCV" type (and in particular of the same type as the second valve 8).

Thus, in the absence of any fault with the second valve 8, the first valve 7 may be controlled in all-or-nothing operation, that is to say that the first valve 7 is switched only between two configurations: fully open and fully closed. By contrast, in the event of a fault with the second valve 8 (for example if it is unable to close), the first valve 7 may be controlled in a proportional mode so as to regulate the flow rate of withdrawn gas to a defined flow rate and/or pressure, from among a plurality of possible values. Thus, the first valve 7 may constitute a redundancy solution for the function of flow rate regulation.

As shown in greater detail in FIG. 2, the withdrawing pipe 3 may comprise, upstream of the first valve 7, at least one of the following: an upstream temperature sensor 27, a pipe provided with a connector 23 for filling the tank 2, an element 24 for heating the gas, a filter 26, an upstream pressure sensor 21. It is to be noted that, as indicated in FIG. 2 by means of a cross on the filling line, after filling of the tank 2 the filling device may be removed and the filling line may be sealed (in the case of single use).

Furthermore, the fluidic circuit may comprise two gas withdrawal branches 17, 18 having an upstream end connected to the withdrawing pipe 3 upstream of the first valve 7 and a downstream end intended to be connected to a gas consumer (for example in order to supply, respectively, a spacecraft passivation system or application for example). Each withdrawal branch 17, 18 comprises an isolating valve 19, 20 which may also be of the same type as the second valve 8 described above (proportional-opening valve used in all-or-nothing mode).

Downstream of the second valve 8, and upstream of the two lines 4, 5, the withdrawing pipe 3 preferably comprises a plenum 26, that is to say a buffer volume for the purpose of stabilizing the pressure and the flow of gas, which serves as a reference for the control of the valve 8.

This plenum 26 is preferably small, for example having a volume of less than 2 cm$^3$. This plenum 26 may be formed, if required, simply by localized widening of the withdrawing pipe 3. Preferably, downstream pressure measurement 9 is carried out at the plenum 26. Similarly, downstream temperature measurement 22 can be carried out at this point.

As illustrated, the regulation of the flow rate and/or of the pressure by means of the second valve 8 can also be in dependence on at least one of the following: the temperature of the gas measured 11 upstream of the first valve 7, the temperature of the gas measured 22 at the plenum.

The flow rate/pressure regulation obtained according to these configurations makes it possible to reach a precision of the order of 1%. The examples of valves 7, 8 used mean that the device is very reliable (in terms of endurance, precision, etc.).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise "Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A gas flow rate regulating device for regulating a flow rate of gas intended to supply a propulsion apparatus for a spacecraft, comprising a tank of pressurized gas, a fluidic circuit connected to the tank, and an electronic data acquisition, storage and processing member configured to control one or both of a second valve and a first valve on the basis of the value measured by a first pressure transducer, said fluid circuit comprising a withdrawing pipe, wherein:

said withdrawing pipe has an upstream end connected to the tank and at least one downstream end intended to be connected to a propulsion apparatus for a spacecraft;

arranged in series from upstream to downstream, the withdrawing pipe comprises an isolating first valve, a regulating second valve, and a first pressure transducer, the first valve being an isolating valve, the second valve being a regulating valve;

the first pressure transducer is configured for measuring a pressure downstream of the second valve;

the second valve provides defined regulation of flow rate and/or pressure in dependence on a pressure measured by the first pressure transducer;

at least the second valve is a proportional valve of the electrically controlled variable throughput "PCV" type;

the first valve is a proportional valve of the electrically controlled variable throughput "PCV" type in the absence of any fault with the second valve, the electronic data acquisition, storage and processing member is configured to control the first valve in all-or-nothing operation such that the first valve is switched only between two configurations: fully open and fully closed;

the electronic data acquisition, storage and processing member is further configured to control the second valve in proportional operation with a plurality of possible degrees of opening of the second valve so as to regulate the flow rate of gas withdrawn from the gas flow rate regulating device to a defined flow rate and/or pressure, from among a plurality of possible values; and in the event of a fault with the second valve, the electronic data acquisition, storage and processing member is configured to control the first valve in proportional operation so as to regulate the flow rate of gas withdrawn from the gas flow rate regulating device to a defined flow rate and/or pressure, from among a plurality of possible values.

2. The gas flow rate regulating device of claim 1, wherein one or both of the second valve and the first valve is a thermally activated electrically controlled proportional regulating valve.

3. The gas flow rate regulating device of claim 1, wherein one or both of the second valve and the first valve is a thermally activated electrically controlled proportional regulating valve that is normally closed when not heated above a given threshold.

4. The gas flow rate regulating device of claim 1, wherein one or both of the second valve and the first valve is a thermally activated electrically controlled proportional regulating valve that is normally closed when not heated above a given threshold in the range of 50 to 180° C.

5. The gas flow rate regulating device of claim 1, wherein one or both of the second valve and the first valve is a thermally activated electrically controlled proportional regulating valve that is normally closed when not heated above a given threshold in the range of 80 to 120° C.

6. The gas flow rate regulating device of claim 1, wherein the pressurized gas is xenon.

7. A method for supplying xenon to a propulsion apparatus for a spacecraft using the flow rate regulating device of claim 1, in which a flow of gas is transferred from the tank to the downstream end of the withdrawing pipe at a pressure and/or flow rate that is defined by means of proportional controlling of the regulating second valve in relation to the pressure value measured by the downstream pressure measurement member.

8. The gas flow rate regulating device of claim 1, wherein the first valve is a proportional valve of the electrically controlled variable throughput "PCV" type.

9. The gas flow rate regulating device of claim 8, further comprising an electronic data acquisition, storage and processing member configured to control one or both of the second valve and the first valve on the basis of the value measured by the first pressure transducer.

10. The gas flow rate regulating device of claim 9, further comprising a second pressure transducer for measuring a pressure upstream of the first valve, wherein the electronic data acquisition, storage and processing member is configured to control one or both of the second valve and the first valve on the basis of the value measured by the second pressure transducer.

11. The device of claim 9, wherein:

in the absence of any fault with the second valve, the electronic data acquisition, storage and processing member is configured to control the first valve in all-or-nothing operation such that the first valve is switched only between two configurations: fully open and fully closed; and the electronic data acquisition, storage and processing member is configured to control the second valve in proportional operation with a plurality of possible degrees of opening of the second valve so as to regulate the flow rate of gas withdrawn from the gas flow rate regulating device to a defined flow rate and/or pressure, from among a plurality of possible values.

12. A gas flow rate regulating device for regulating a flow rate of gas intended to supply a propulsion apparatus for a spacecraft, comprising a tank of pressurized gas and a fluidic circuit connected to the tank, said fluid circuit comprising a withdrawing pipe, wherein:

said withdrawing pipe has an upstream end connected to the tank and at least one downstream end intended to be connected to a propulsion apparatus for a spacecraft;

arranged in series from upstream to downstream, the withdrawing pipe comprises an isolating first valve, a regulating second valve, and a first pressure transducer, the first valve being an isolating valve, the second valve being a regulating valve;

the first pressure transducer for measuring a pressure downstream of the second valve;

the second valve provides defined regulation of flow rate and/or pressure in dependence on a pressure measured by the first pressure transducer;

at least the second valve is a proportional valve of the electrically controlled variable throughput "PCV" type;

one or both of the second valve and the first valve is a thermally activated electrically controlled proportional regulating valve; and the thermally activated proportional regulating valve comprises a body defining an inlet and an outlet for the gas and housing, between the inlet and the outlet, at least one and preferably two pistons and an obturator that is configured to interrupt or permit a defined flow of gas between the inlet and the outlet depending on the relative position between the obturator and the piston or pistons secured to the body;

the outer body is provided with a heating member; and the body has a thermal expansion coefficient different from that of the pistons so as to move the pistons relative to the obturator in defined positions depending on the degree of heating of the body so as to regulate the flow rate of gas.

* * * * *